March 6, 1934.  D. B. KNIGHT  1,950,148
CONTROL OF FLUID CIRCULATION
Filed Jan. 7, 1932
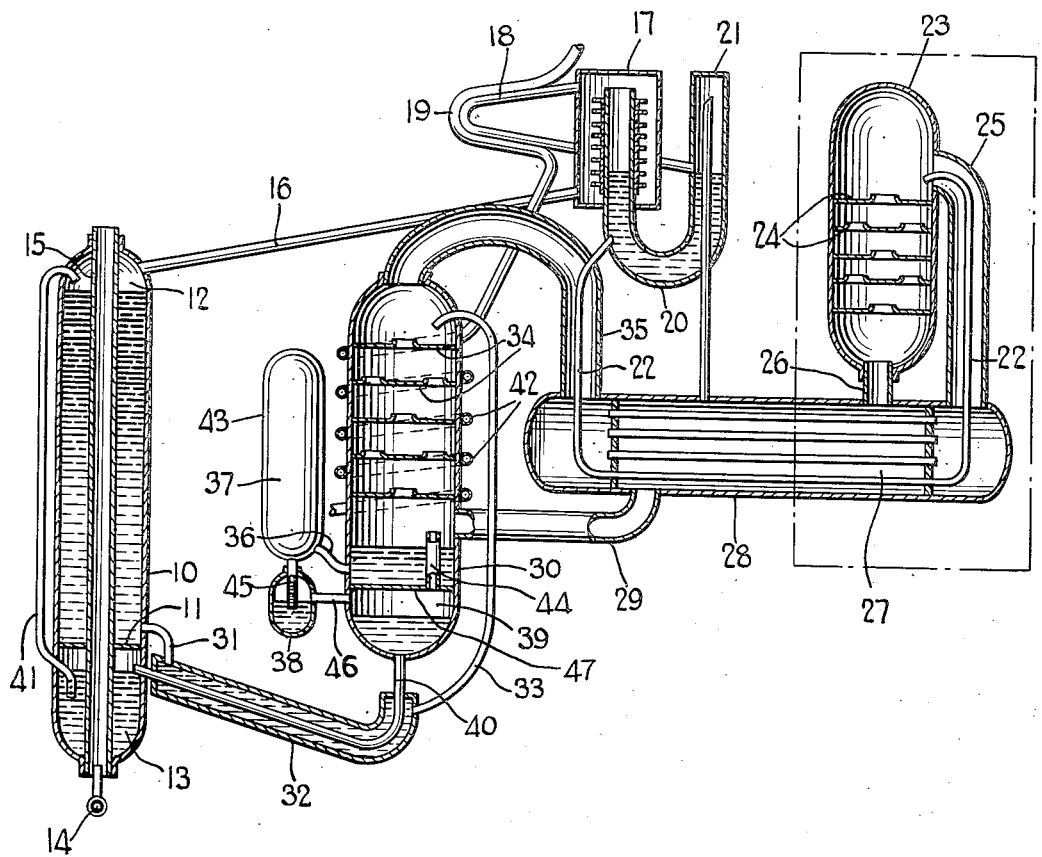
INVENTOR.
Donald Branch Knight
BY
ATTORNEY Patented Mar. 6, 1934

1,950,148

UNITED STATES PATENT OFFICE 1,950,148

CONTROL OF FLUID CIRCULATION

Donald Branch Knight, Brooklyn, N. Y., assignor to Electrolux Servel Corporation, New York, N. Y., a corporation of Delaware Application January 7, 1932, Serial No. 585,369

13 Claims. (Cl. 62—119.5)

This invention relates to liquid circulating systems and more particularly to those in which circulation is accomplished by the application of heat to one portion of the system.

A particular form of such a system in which the circulation is continuous is one utilizing thermosyphonic action for raising the liquid to a level from which it circulates by gravity. A system of this type is employed for circulating absorption liquid between the generator and absorber of absorption type refrigerating apparatus, for instance, as described in Patent No. 1,609,334 to von Platen et al.

In accordance with this invention the liquid circulation is varied more closely responsive to the variation in heat input and this is accomplished by utilizing change of pressure in the system to correspondingly increase or decrease the pumping head or relative height of the liquid above the bottom of the thermosyphon conduit as compared with the total height to which liquid is raised.

This invention will be more fully understood by reference to the following description taken in connection with the accompanying drawing in which the figure shows an absorption refrigerating apparatus of the type disclosed in the above mentioned patent to von Platen in which an absorption liquid circulating system in accordance with this invention is employed.

Referring to the drawing, a generator 10 is divided by a partition 11 into a main or generating chamber 12 and an auxiliary or pump chamber 13 which are both heated by burner 14 in the flue 15 which extends upwardly through the generator. In the main generating chamber 12 a solution of refrigerant gas in an absorption liquid such as ammonia in water, is heated to expel the gas from solution. The gas passes through an upwardly sloping conduit 16 into a rectifier 17 where water vapor is condensed out of the ammonia gas and drains back to the generator through conduit 16. Ammonia gas from the rectifier is liquefied in condenser 18 which is cooled by heat exchange with water flowing through coil 19. The liquid ammonia flows into a U-tube 20 having one end 21 closed and the other end extending upwardly within and opening near the top of rectifier 17.

Liquid ammonia from the U-tube 20 flows through conduit 22 to the upper part of the evaporator 23 where it flows downwardly over baffle plates 24 and evaporates into an inert auxiliary gas, such as hydrogen, which enters the evaporator through conduit 25. The resulting gas mixture being heavier than the pure hydrogen flows downwardly from the bottom of the evaporator 23 through conduit 26, chamber 27 of the gas heat exchanger 28, and conduit 29 into the lower part of the absorber 30.

Weak solution from the generator flows by gravity through conduit 31, heat exchanger 32, and conduit 33 into the upper part of the absorber 30 where it flows downwardly over baffle plates 34 absorbing ammonia from the gas mixture which enters the absorber through conduit 29. The heat of absorption is removed by cooling water flowing through coil 42 which is shown connected in series with the condenser cooling coil 19. The hydrogen from which the ammonia gas has been absorbed returns to the evaporator 23 through conduit 35, heat exchanger 28, and conduit 25.

Strong liquor collects in the bottom of the absorber 30 from where it flows through conduit 36, control chamber 37, and liquid trap 38 into reservoir 39. From the reservoir the liquid flows in conduit 40 through the liquid heat exchanger 32 to the auxiliary or pump chamber 13 from where it is raised in a well known manner through a thermosyphon conduit 41 back to the main generating chamber 12. For a more detailed description of this apparatus reference may be had to the above mentioned Patent No. 1,609,334 to von Platen et al.

The parts added to the above system in accordance with this invention are the closed vessel 43 enclosing the control chamber 37, the liquid trap 38, and the reservoir 39. The latter may be formed integrally with the absorber, as shown, by providing a partition 47 to form the bottom of the absorber, thus dividing the lower part of the absorber into upper and lower reservoirs. The upper reservoir is connected to the control chamber 37 through an overflow conduit 36 extending upwardly from below the normal liquid level in the former, thus forming a liquid trap. The upper part of reservoir 39 is vented into the absorber 30 through conduit 44 so that the pressures in these chambers are equalized.

The control chamber 37 is filled with a definite quantity of inert gas. In the operation of the above system a definite quantity of hydrogen becomes pocketed in this chamber and is sealed off by the absorption liquid which collects in the bottom of the absorber 30 and the liquid which collects in trap 38 connected between the bottom of the control chamber and the reservoir 39.

As evaporation of the ammonia occurs in the evaporator 23 the pressure in the system rises depending upon the temperature at which the evaporation takes place, that is, the evaporator temperature. As the pressure rises the hydrogen pocketed in the control chamber 37 is compressed and since the increased pressure is exerted on the liquid in the bottom of the absorber 30 and also through vent 44 into reservoir 39, liquid is forced upwardly in conduit 36 and leg 45 of the trap 38 whereby there will be a more rapid flow of liquid from the reservoir in the bottom of the absorber into the reservoir 39, thus increasing the liquid level in the latter above the opening of the thermosyphon conduit 41 whereby the pumping head is increased.

It will be apparent that, during rise of pressure in the system, the quantity of liquid overflowing through conduit 36 when the pressures in vessel 43 and absorber 30 are the same will be increased by displacement of liquid in the absorber downwardly below the normal overflow level due to the unequal pressures. This additional quantity of liquid, less that forming the liquid column in leg 45 of the trap 38, flows into reservoir 39 thus raising the level in the latter and increasing the pumping head, that is, decreasing the lifting height of the thermosyphon 41. As a result, the rate of circulation of absorption liquid is increased and maintained until the head is again decreased by decrease in the rate of liquid flow to the reservoir 39 as the lower part of the absorber 30 fills up to the normal overflow level when the pressure decreases.

As the evaporator temperature decreases the pressure correspondingly decreases and the rate of liquid flow from the bottom of the absorber 30 into the reservoir 39 is decreased. In this manner the level of the liquid in the reservoir 39 rises and falls with the evaporater temperature and pressure whereby the rate of absorption liquid circulation is regulated. This regulation is very sensitive since the change in pumping rate through the thermosyphon conduit is very appreciable for a slight change in the level of the liquid in the reservoir 39. Since the rate of liquid circulation is responsive to the evaporator and absorber conditions it is dependent upon the heat input and thus sensitive control of the pumping rate is obtained responsive to the input.

It will be obvious to those skilled in the art that various other changes may be made in the construction and arrangement without departing from the spirit of the invention and therefore this invention is not limited to what is shown in the drawing and described in the specification but only as indicated in the appended claims.

I claim:

1. In continuous absorption refrigerating systems in which circulates an inert pressure equalizing gas, a thermosyphon for circulating absorption liquid between the generator and absorber, a reservoir below the absorber and connected in the absorption liquid circuit between the absorber and said thermosyphon, a pressure equalizing conduit between the absorber and said reservoir, a closed vessel containing a definite quantity of inert gas and connected to receive liquid from the lower part of the absorber by overflow through a liquid trap and to discharge liquid into said reservoir by overflow through a second liquid trap.

2. In continuous absorption refrigerating systems of the pressure equalized type having a vapor liquid lift for raising absorption liquid to a level in the generator from which it flows through the absorber by gravity, a partition dividing the lower end of the absorber to form upper and lower liquid reservoirs, a conduit connecting the absorber to said lower reservoir above the normal liquid level in the latter, a closed vessel containing a definite quantity of inert gas, an overflow conduit extending upwardly from below the normal liquid level in said upper reservoir to said vessel, a conduit to drain liquid from said vessel into said lower reservoir, a liquid trap in said last conduit, and a conduit for conducting liquid by gravity from said lower reservoir to the vapor liquid lift.

3. In continuous absorption refrigerating systems of the pressure equalized type having a vapor liquid lift for raising absorption liquid to a level in the generator from which it flows through the absorber by gravity, means for controlling the operation of said lift responsive to the heat input to the generator comprising a reservoir connected to supply liquid to said liquid lift by gravity, a pressure equalizing connection between said reservoir and the absorber, and a vessel enclosing a control chamber filled with a definite quantity of inert gas and connected through a liquid trap to receive absorption liquid from the absorber by overflow and connected to drain into said reservoir through a second liquid trap.

4. In continuous absorption refrigerating systems of the pressure equalized type, a thermosyphon pump for circulating absorption liquid between the generator and the absorber, and means for regulating the operation of said thermosyphon pump responsive to pressure in the system comprising means for maintaining a liquid column for said thermosyphon pump, and means for increasing and decreasing the height of said column responsive to the pressure in the absorber.

5. In continuous absorption refrigerating systems of the pressure equalized type, a thermosyphon for circulating the absorption liquid between the generator and the absorber, and means for controlling the operation of said thermosyphon comprising means for maintaining a liquid column for said thermosyphon and means for transferring absorption liquid from the absorber to said column at the rate dependent upon the pressure in the absorber.

6. In absorption type refrigerating systems a vapor liquid lift for circulating the absorption liquid, and means for varying the lifting head to control the circulation responsive to the heat input of the system.

7. In a fluid circuit through which liquid is circulated by a vapor liquid lift, upper and lower reservoirs in a descending portion of the circuit, a pressure equalizing connection between said reservoirs, a closed chamber containing a definite quantity of inert gas, a liquid trap overflow connection from the upper reservoir to said chamber, and a drain having a liquid trap from said chamber to the lower reservoir.

8. In a fluid circuit through which liquid is circulated by a vapor liquid lift, means for controlling circulation responsive to pressure in the system comprising a closed chamber filled with a definite quantity of inert gas and connected in a descending portion of the circuit between two liquid traps, said traps and chamber being shunted by a pressure equalizing connection.

9. In a fluid circuit through which liquid is circulated by a thermosyphon, means for controlling circulation comprising a closed chamber containing a definite quantity of inert gas and connected in a descending portion of the circuit between two liquid traps, and a pressure equalizing shunt connection around said traps and said chamber.

10. In a descending fluid conduit, upper and lower reservoirs, a pressure equalizing connection between said reservoirs, a closed chamber containing a definite quantity of inert gas, a liquid trap overflow connection from the upper reservoir to said chamber, and a drain having a liquid trap from said chamber to the lower reservoir.

11. Means for controlling downward flow of liquid in a descending fluid conduit, comprising an upper and a lower liquid trap, a definite quantity of inert gas in the conduit between said traps, and a pressure equalizing connection shunted around said traps.

12. Means for controlling the passage of liquid through a descending fluid conduit comprising a chamber containing a definite quantity of inert gas and connected in said conduit between two liquid traps, and a pressure equalizing connection shunted around said traps.

13. Means for controlling the flow of fluid between an upper and a lower reservoir responsive to the pressure in said reservoirs comprising a chamber containing a definite quantity of inert gas connected to the upper reservoir through a liquid trap overflow and to the lower reservoir through a drain having a second liquid trap, and a pressure equalizing connection between said reservoirs.

DONALD BRANCH KNIGHT.